United States Patent [19]

Kim

[11] Patent Number: 5,610,816

[45] Date of Patent: Mar. 11, 1997

[54] AUTOMATIC STEERING METHOD AND APPARATUS FOR A NON-RAILED TRANSFER CRANE

[75] Inventor: Young Bae Kim, Suwon, Rep. of Korea

[73] Assignee: Samsung Heavy Industries, Co., Changwon, Rep. of Korea

[21] Appl. No.: 422,646

[22] Filed: Apr. 14, 1995

Related U.S. Application Data

[63] Continuation of Ser. No. 119,465, Sep. 10, 1993, abandoned.

[30] Foreign Application Priority Data

Sep. 15, 1992 [KR] Rep. of Korea .................. 9216761

[51] Int. Cl.$^6$ ............................................. G06F 7/70
[52] U.S. Cl. ................... 364/424.028; 318/587; 318/568.12; 180/169; 180/168; 348/116; 348/119; 348/114; 348/155; 364/443; 364/450
[58] Field of Search ................... 364/424.02, 424.01, 364/424.05, 571.04, 444, 443, 450, 449; 318/587, 568.12; 212/124–128, 131; 180/167–169; 348/155, 207, 123, 116, 119, 114; 355/60, 77; 382/110, 153; 356/376

[56] References Cited

U.S. PATENT DOCUMENTS

| | | | |
|---|---|---|---|
| 4,054,917 | 10/1977 | Race | 348/123 |
| 4,532,757 | 8/1985 | Tutle | 382/110 |
| 4,611,283 | 9/1986 | Lumelsky et al. | 364/571.04 |
| 4,652,803 | 3/1987 | Kamejima et al. | 318/587 |
| 4,736,812 | 4/1988 | Livneh | 180/168 |
| 4,779,203 | 10/1988 | McClure et al. | 364/424.02 |
| 4,825,263 | 4/1989 | Desjardins et al. | 356/376 |
| 4,858,132 | 8/1989 | Holmquist | 364/424.02 |
| 4,862,047 | 8/1989 | Suzuki et al. | 318/587 |
| 4,866,617 | 9/1989 | Matsuda et al. | 364/424.02 |
| 4,894,716 | 1/1990 | Aschwanden et al. | 348/155 |
| 5,087,969 | 2/1992 | Kamada et al. | 358/103 |
| 5,101,351 | 3/1992 | Hattori | 364/424.02 |
| 5,122,957 | 6/1992 | Hattori | 364/424.02 |
| 5,172,315 | 12/1992 | Asanuma et al. | 364/424.02 |
| 5,245,422 | 9/1993 | Borcherts et al. | 358/103 |
| 5,545,960 | 8/1996 | Ishikawa | 364/424.02 |

FOREIGN PATENT DOCUMENTS

WO92/19526   11/1992   WIPO.

*Primary Examiner*—Kevin J. Teska
*Assistant Examiner*—Jacques Louis-Jacques
*Attorney, Agent, or Firm*—Morgan & Finnegan, L.L.P.

[57] ABSTRACT

The present invention relates to an automatic system for controlling the steering of a non-railed transfer crane travelling along a lane indicant. The system comprises a vision sensor for continuously photographing the condition of a crane's actual travelling direction with respect to lanes represented by the lane indicant, and outputting predetermined deviations (distance as well as angle) showing off-centered degrees between the crane's actual travelling direction and the lanes based on the photographed image signal, and a deviation processor for outputting a control signal to a motor driver so that the crane can travel toward removing the deviation distance. By properly changing a rotative velocity of the crane's wheels, the present invention prevents the crane's travelling direction from being off-centered from the lanes.

3 Claims, 3 Drawing Sheets

AUTOMATIC STEERING METHOD AND APPARATUS FOR A NON-RAILED TRANSFER CRANE

CROSS REFERENCE TO RELATED APPLICATION

This application is a continuation of application Ser. No. 08/119,465 filed on Sep. 10, 1993 now abandoned.

BACKGROUND OF THE INVENTION

The present invention relates to an automatic steering system for non-railed transfer cranes using pneumatic tires, and more particularly to an automatic steering method and apparatus for a non-railed transfer crane, in which steering deviations occurring during the crane's travel are detected using a vision sensor and corresponding signals are used to automatically control the crane's steering so that the deviations can be corrected.

Generally, non-railed transfer cranes ("non-railed transfer crane" and "crane" are used interchangeably hereinafter) have been widely used for transferring containers or cargos, such cranes typically being equipped with pneumatic tires. The non-railed transfer crane travels along set lanes to transfer cargoes or to load/unload goods. However, non-railed transfer cranes tend to deviate slightly from the set lanes during travelling. That is, measurable deviations of distance and angle between the crane's actual travelling path and set lanes frequently occur. These deviations occurring during the crane's travels result from variations in cargo mass and from non-linearities in the driving motor of the crane.

In order to cause the crane to travel straight along its set lanes, deviations of angle and distance must be compensated in real time. Deviations heretofore have been controlled either manually by an operator, or automatically by an automatic steering system.

FIG. 1 shows a top view of a conventional crane 10. Wheels 12 equipped with pneumatic tires are attached at the four corners of the crane's main body 11, and the crane 10 transfers cargoes 14 travelling along lane 13. If the crane is operated manually, the inexperience of an operator can cause the wheels 12 to deviate from the lane 13. The use of automatic steering systems (i.e., machine controlled) solves many problems associated with manual steering systems.

One type of automatic steering system uses current-looping wire. In such an automatic steering system, wires are laid under the crane's lane of travel, a predetermined amount of electric current is supplied to the laid wire, and the magnetic field resulting from such current flow is sensed by the crane, inducing the crane's motion along the wire path. However, there are drawbacks to automatic steering systems using current-looping wire. First, the installation of the current looping wire which induces the crane's travelling is quite expensive. Second, damage to the wire resulting from subsidence of the ground where the wire is laid can occur. Third, reinforcing bars found in concrete slabs, and power wires installed in the crane itself can cause errors in the current sensed from the looping wire.

To overcome the above-identified problems, it has been proposed to use a gyro sensor as one of the automatic steering systems. A gyro sensor senses the angle of deviation, indicating the degree to which an off-centered wheel of the crane deviates during the crane's travel. That is, as shown in FIG. 2, the gyro sensor measures deviation angle ($\theta$) between the crane's actual path of travel and lanes 13. An encoder is attached to the wheel in order to measure the travelling distance (l) of the crane. The deviation angle ($\theta$) and travelling distance (l) obtained by the gyro sensor and encoder, respectively, are processed by a microprocessor to calculate the deviation distance ($\delta$). The microprocessor then generates a control signal for controlling a driving motor of the crane so as to minimize the deviation distance ($\delta$). Thus, the travelling distance (l) of the crane is compensated by the control signal, thereby preventing further deviation of the crane's wheels, and returning the crane to its intended direction.

Automatic steering systems with such a gyro sensor have the following disadvantages, however. First, deviation angle ($\theta$) data sensed by the gyro sensor experiences a drift phenomenon which unstably varies the data with time and temperature. As shown in FIG. 3, the measured deviation angle ($\theta$) does not remain constant over the time. The value changes slightly with variations time. If measured deviation angle ($\theta$) is unstable, the value of deviation distance ($\delta$) is incorrectly calculated, thereby causing errors in steering control. Second, when difference values of deviation distance ($\delta$) based on the deviation angle sensed by gyro sensor are accumulated, errors of deviation distance obtained by the drift phenomenon are also accumulated. Therefore, the accumulated values of the error must be reset to a predetermined compensation value whenever the crane travels a certain distance, in order to prevent accumulating errors. Third, a setting device is additionally required for setting the deviation angle ($\theta$) to "0" whenever the crane travels.

SUMMARY OF THE INVENTION

To solve the above problems, it is an object to the present invention to provide an improved automatic steering method for easily calculating deviation and controlling a crane's steering.

It is another object of the present invention to provide an automatic steering apparatus for accomplishing the above automatic steering method.

The object of the present invention is accomplished by providing a method for automatically controlling the steering of a non-railed transfer crane travelling along a lane indicant. The method includes the step of providing a photographing unit with previously set horizontal center line and vertical center line to photograph a lane indicant along the crane's travelling direction, and generating an image signal. The method includes the further steps of calculating a deviation distance between a video center point, defined by the intersection of the horizontal and vertical center lines, and the lane indicant and generating a motor control signal for controlling the rotation of a motor which drives crane wheels so that the crane can travel toward minimizing the calculated deviation distance.

Another object of the present invention is achieved by an apparatus for controlling the steering of a non-railed transfer crane travelling along a lane indicant. The apparatus includes a vision sensor for continuously photographing an angular condition between the crane's travelling direction and the lane indicant while the crane is travelling and for outputting a signal indicative of the angular deviation distance, which represents the off-centered degree between the crane's actual travelling direction and the lane indicants obtained from the photographed image signal. The apparatus further includes a deviation processor for receiving deviation distance signals from the vision sensor and generates predetermined control signal to control a motor which drives the crane wheels, so that the crane can travel to minimize the calculated deviation distance. The apparatus also includes a motor driver for controlling the crane motor in response to the control signal supplied from the deviation processor.

BRIEF DESCRIPTION OF THE DRAWINGS

The objects and features of the present invention will become more apparent from consideration of the following detailed description taken in conjunction with the accompanying drawings in which.

DETAILED DESCRIPTION

Preferred embodiments of the present invention will be described below in more detail with reference to the accompanying drawings.

Figure 1:
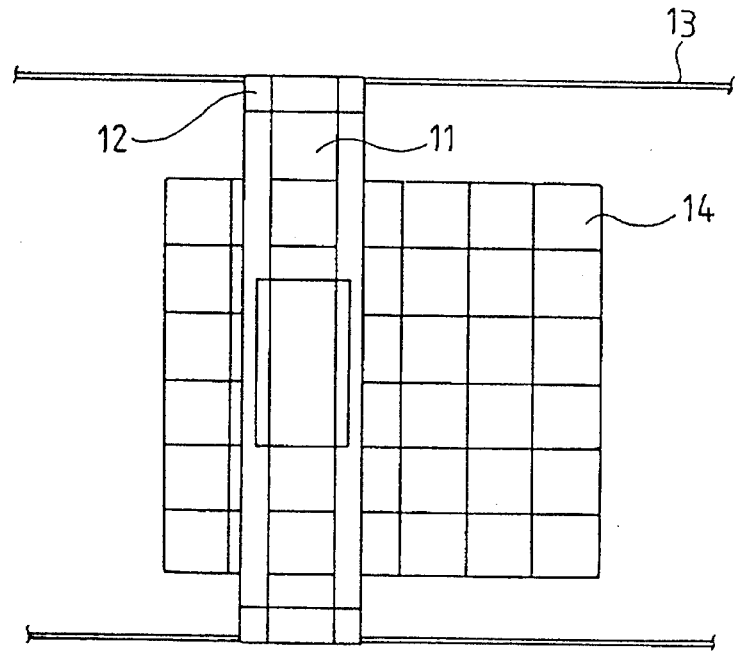
FIG. 1 is a general conceptual view showing a condition of a crane and lanes.
Figure 2:
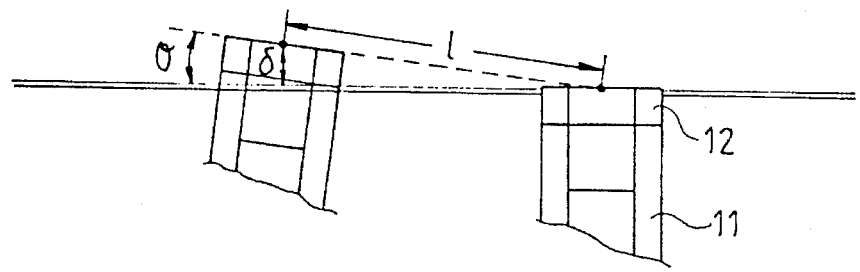
FIG. 2 is a conceptual view showing deviations between the direction of travel of a crane and lane indicants.
Figure 3:
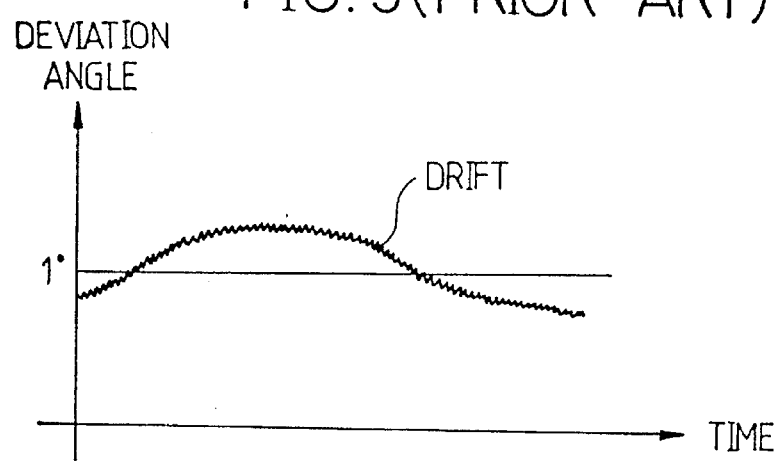
FIG. 3 is a graph showing a measured deviation angle in a conventional automatic steering apparatus.
Figure 4:
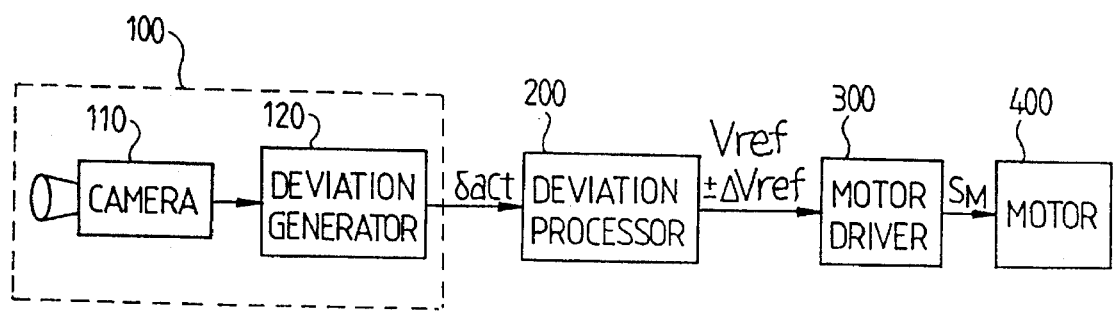
FIG. 4 is a block diagram illustrating an embodiment of an automatic steering apparatus in accordance with the present invention.

FIG. 4 illustrates an embodiment of an automatic steering apparatus using a vision sensor in accordance with the present invention.

The apparatus of FIG. 4 includes a vision sensor 100 for measuring deviation angle ($\theta_{act}$) and deviation distance ($\delta_{act}$) corresponding to the off-centered degree between a crane's actual travelling direction and lanes during travel of the crane. A deviation processor 200 receives signals representing deviation angle ($\theta_{act}$) and deviation distance ($\delta_{act}$) as measured by the vision sensor 100 and generates a voltage signal ($V_{ref} \pm \Delta V_{ref}$) indicative of the deviation to control the crane's travelling direction so that deviation distance can be minimized. A motor driver 300 controls the rotation of a crane motor 400 according to the control signal supplied from the deviation processor 200.

Figure 5:
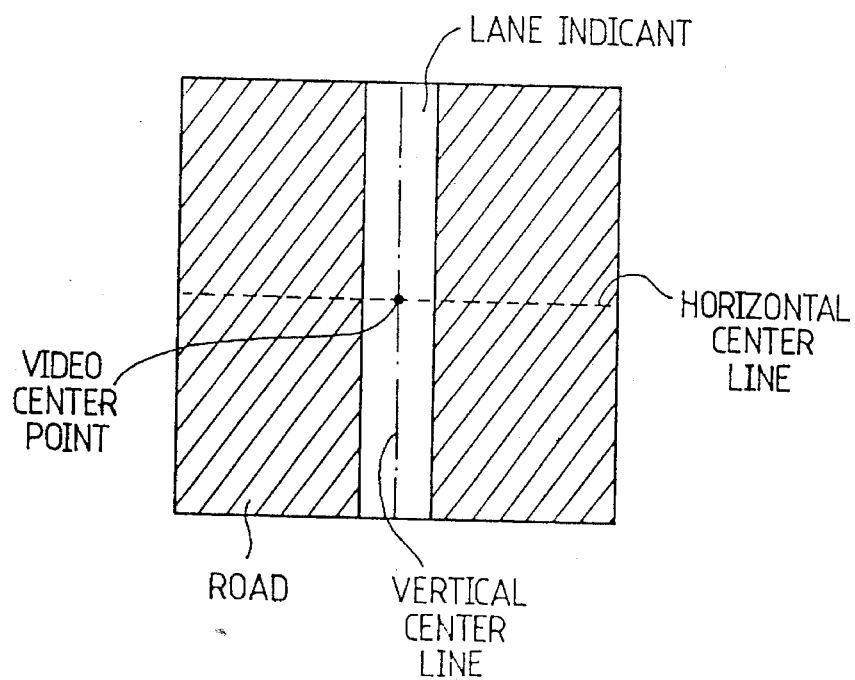
FIG. 5 is a schematic view showing an image photographed by a camera in a device of FIG. 4.

The vision sensor 100 includes a camera 110, which photographs the proceeding direction of the crane wheels. The camera 110 photographs the crane's path of travel behind and in front of the crane. FIG. 5 shows a schematic view of a picture photographed with camera 110. A photographing unit (not shown) of the camera 110 sets up a horizontal center line and a vertical center line for an image to be photographed. Sensed is whether a video center point, defined by the intersection between the horizontal and vertical center lines, accords with the lane indicant during the crane's travel. The lane indicant corresponds to the desired lane of travel. A signal representing the photographed image captured by the camera 110 is supplied to a deviation generator 120. The deviation generator 120 calculates deviation angle ($\theta_{act}$) and deviation distance ($\delta_{act}$) between the crane's actual travelling direction and the lane based on the video signal transmitted from the camera 110.

Figure 6:
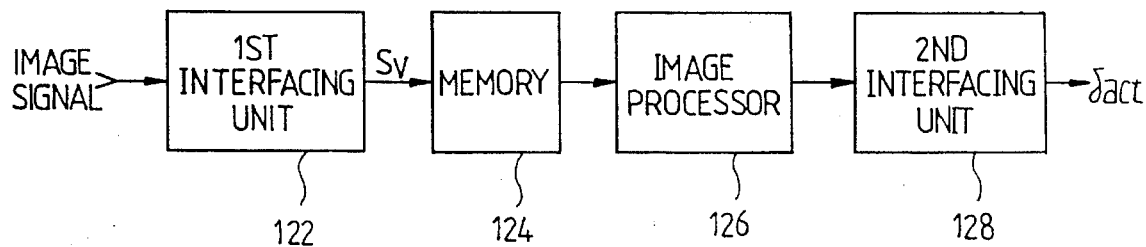
FIG. 6 is a detailed block diagram illustrating a deviation generator of FIG. 4.

FIG. 6 shows a detailed block diagram of the deviation generator 120. The video signal supplied from the camera 110 is supplied to a first interfacing unit 122. The first interfacing unit converts the video signal into a digital image signal ($S_v$) and stores the converted signal in a memory 124. Then, the memory 124 stores, in order, succeeding image signals photographed by the camera. The stored image signals in memory 124 are supplied to an image processor 126. The image processor 126 receives an image signal corresponding to a particular photographed picture, senses deviation angle per each photographed picture as measuring off-centered degrees according to a result of comparing the video center point defined by the image's horizontal and vertical center lines with the lane indicant. The image processor outputs deviation data corresponding to deviation distance. This deviation data from the image processor 126 is supplied to a second interfacing unit 128. The second interfacing unit 128 receives deviation data from the image processor 126, generates a signal ($\delta_{act}$) representing the deviation distance, and applies the signal to the deviation processor 200 (FIG. 4).

The deviation processor 200 performs a stored algorithm on the inputted deviation distance ($\delta_{act}$), and calculates the value of a voltage signal ($V_{ref} \pm \Delta V_{ref}$) necessary to minimize deviation distance. The algorithm for calculating the voltage signal will be explained in detail hereinafter.

The voltage signal ($V_{ref} \pm \Delta V_{ref}$) calculated in the deviation processor 200 is supplied to a motor driver 300. In response, the motor driver 300 outputs a corresponding motor driving signal ($S_M$) according to the voltage signal ($V_{ref} \pm \Delta_{ref}$). The motor driving signal ($S_M$) controls the rotation of the motor in order to minimize the deviation distance ($\delta_{act}$) sensed by the vision sensor 100. That is, the motor driving signal ($S_M$) controls the rotative velocity of the motor for rotating the crane's wheels and changes the rotative velocity of both wheels of the crane which travel along the two lanes. Thus, the crane's steering is controlled in order to make the crane's actual travelling distance accord with the lane. While the crane's steering is controlled in order to make the crane's actual travelling direction to accord with the lane, the vision sensor 100 continuously photographs the relationship between the crane's travelling direction and the lane. The deviation generator 120 calculates the current deviation distance ($\delta_{act}$) from the photographed image signal ($S_V$), and the deviation processor 200 again generates a new voltage signal ($V_{ref} \pm \Delta V_{ref}$) so as to minimize the deviation distance and supplies the voltage signal to the motor driver 300. A series of control operations are performed repeatedly, and thereby the crane's travelling is returned to normal.

Figure 7:
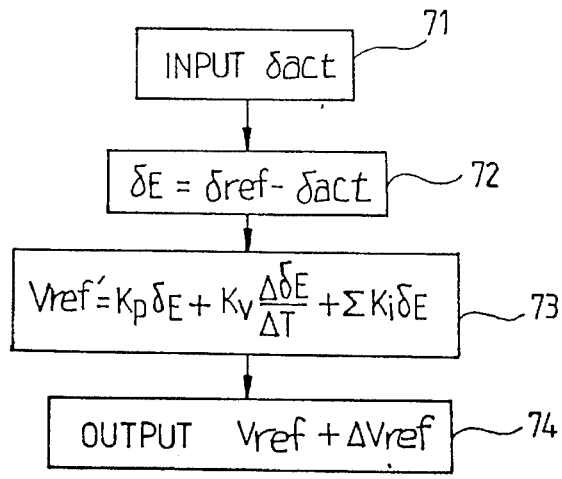
FIG. 7 is a flow diagram illustrating a computation algorithm performed in a device of FIG. 4.

FIG. 7 shows a series of process steps performed by the deviation processor 200 of FIG. 4, which steps represent the algorithm for compensating for deviation distance. Deviation distance ($\delta_{act}$) measured by vision sensor 100 is input to a deviation distance computation unit (step 71). The deviation distance computation unit calculates differential deviation distance ($\delta_E$) between a predetermined reference deviation distance ($\delta_{ref}$) and measured deviation distance ($\delta_{act}$) by means of the following equation (1) (step 72).

$$\delta_E = \delta_{ref} - \delta_{act} \quad (1)$$

Here, the reference deviation distance ($\delta_{ref}$) corresponds to a reference distance to discriminate an off-centered condition between the crane's travelling direction and the lane. The deviation distance computation unit carries out a computation process with the following equation (2) on the differential deviation distance ($\delta_E$) calculated by the equation (1), thereby calculating a predetermined voltage signal ($V_{ref}'$) (step 73).

$$V_{ref}' = K_P \delta_E + K_V \frac{\Delta \delta_E}{\Delta T} + \Sigma K_i \delta_E \qquad (2)$$

The voltage signal ($V_{ref}'$) calculated in equation (2) refers to the voltage signal calculated from the differential deviation distance ($\delta_E$), calculated with equation (1). When the voltage signal ($V_{ref}'$) calculated with the differential deviation distance ($\delta_E$) and the crane's steering are normal, a difference voltage signal ($\Delta V_{ref}$) between reference voltage signals ($V_{ref}$) supplied to the motor driver 300 is calculated.

The difference voltage signal ($\Delta V_{ref}$) has a positive or negative value according to whether the crane's travelling direction deviates toward the right or left of the lane. Since the motor driver 300 is input both reference voltage signal ($V_{ref}$) and difference voltage signal ($\Delta V_{ref}$), it changes the rotative velocity of right or left wheels. Accordingly, the travelling direction of the crane is adjusted to accord with the lane.

Also, the first term of the equation (2) shows a degree of current differential deviation distance, and Kp represents a proportionality constant having units of voltage per differential deviation distance. The second term is a differential value corresponding to a current differential deviation distance, and Kv represents a differential constant having units of voltage per time variation of differential deviation distance. The third term is a summation value of all the differential deviation distances, and $K_i$ represents an integral constant having units of voltage per accumulated values of differential deviation distance. Here, a differential value of differential deviation distance ($\Delta \delta_E/\Delta T$) is the variation of differential deviation distance per sampling period ($\Delta T$). Referring to FIG. 7, a predetermined sampling period ($\Delta_2$) corresponds to a period from step 71 for inputting measured deviation distance ($\delta_{act}$) to step 74 for generating a predetermined voltage signal ($V_{ref} \pm \Delta V_{ref}$).

AS described above, an automatic steering system for non-railed transfer crane in accordance with the present invention automatically controls a crane's travelling direction using a vision sensor for easily measuring the crane's deviations (distance as well as angle) which represents an off-centered degree between the crane's travelling direction and the lane. As a result, the present invention can both solve problems with a conventional systems and also exactly control the crane's steering.

Although a preferred embodiment of the invention has been illustrated in the accompanying Figures and described in the foregoing Detailed Description, it will be understood that the invention is capable of numerous rearrangements, modifications and substitutions without departing from the scope of the invention.

What is claimed is:

1. A method for automatically steering a non-railed transfer crane travelling along a lane indicant, comprising the steps of:

photographing a lane indicant along the crane's travelling direction with a photographing unit having a previously set horizontal center line intersecting with a previously set vertical center line to define a video center point and generating an image signal:

calculating an actual deviation distance between said video center point and the lane indicant; and generating a motor control signal for controlling the rotation of a motor which drives wheels of the crane so that the crane travels toward minimizing said calculated actual deviation distance wherein said generating step further comprises the sub-steps of calculating a differential deviation distance $\delta_E$ equal to the difference between said calculated actual deviation distance and a reference deviation distance, and calculating a voltage signal $V_{ref}'$ for controlling said motor so that said differential deviation distance can approach zero, wherein said voltage signal $V_{ref}'$ is calculated with the following equation:

$$V_{ref}' = K_P \delta_E + K_V \frac{\Delta \delta_E}{\Delta T} + \Sigma K_i \delta_E,$$

wherein $K_p$ represents a proportionality constant having units of voltage per differential deviation distance;

$K_v$ represents a differential constant having units of voltage per time variation of differential deviation distance;

$K_i$ represents an integral constant having units of voltage per accumulated values of differential deviation distance; and $\Delta T$ represents a sampling period having units of time.

2. An automatic steering apparatus for controlling a non-railed transfer crane travelling along a lane indicant defining a lane, comprising:

a camera having a photographing unit for continuously photographing an off-centered condition between the direction of travel of said crane and said lane during the travel of said crane, said photographing unit having a previously set horizontal line intersecting with a previously set vertical line to define a video center point at said intersection;

means for converting a video signal input from said camera into a digital image signal;

means for calculating an actual deviation distance between said video center point and said lane indicant from said image signal;

a deviation processor for receiving the calculated actual deviation distance from said calculating means, said deviation processor calculating a differential deviation distance $\delta_E$ equal to the difference between said calculated actual deviation distance and a reference deviation distance, calculating a voltage signal $V_{ref}'$ so that said differential deviation distance can approach zero, and generating a control signal based upon said calculated voltage signal to control a motor which drives wheels of said crane to travel toward minimizing the actual deviation distance; and a motor driver for controlling said motor according to the control signal supplied from said deviation processor, wherein said voltage signal $V_{ref}'$ is calculated with the following equation:

$$V_{ref}' = K_P \delta_E + K_V \frac{\Delta \delta_E}{\Delta T} + \Sigma K_i \delta_E,$$

wherein $K_p$ represents a proportionality constant having units of voltage per differential deviation distance;

$K_v$ represents a differential constant having units of voltage per time variation of differential deviation distance;

$K_i$ represents an integral constant having units of voltage per accumulated values of differential deviation distance; and $\Delta T$ represents a sampling period having units of time.

3. The automatic steering apparatus of claim 2, wherein said means for calculating said actual deviation distance further comprises:

an interfacing unit for converting said video signal supplied from said camera into said image signal;

a memory for storing the image signal input from said interfacing unit; and means for calculating actual deviation distance between the crane's travelling direction and the lane based on image data input from said memory and stored data representing a normal condition of steering.

* * * * *